(12) United States Patent
Jen

(10) Patent No.: US 8,611,008 B2
(45) Date of Patent: Dec. 17, 2013

(54) OPTICAL SYSTEM CAPABLE OF ENHANCING SPECIFIC POLARIZATION STATE OF LIGHT AND LIGHT SOURCE SYSTEM INCLUDING SAME

(75) Inventor: Yi-Jun Jen, Keelung (TW)

(73) Assignee: National Taipei University of Technology, Taipei (TW)

( * ) Notice: Subject to any disclaimer, the term of this patent is extended or adjusted under 35 U.S.C. 154(b) by 497 days.

(21) Appl. No.: 12/917,503

(22) Filed: Nov. 2, 2010

(65) Prior Publication Data
US 2011/0310586 A1  Dec. 22, 2011

(30) Foreign Application Priority Data
Jun. 18, 2010 (TW) .............................. 99119780 A

(51) Int. Cl.
*G02B 5/30* (2006.01)
(52) U.S. Cl.
USPC ............ 359/489.08; 359/489.09; 359/489.11; 359/489.07
(58) Field of Classification Search
USPC .............. 359/489.07, 489.08, 489.09, 489.11
See application file for complete search history.

(56) References Cited

U.S. PATENT DOCUMENTS

| | | | | |
|---|---|---|---|---|
| 2,748,659 | A * | 6/1956 | Schroder et al. | 359/489.11 |
| 3,743,380 | A * | 7/1973 | Fugitt | 362/310 |
| 4,516,837 | A * | 5/1985 | Soref et al. | 349/196 |
| 4,645,302 | A * | 2/1987 | Aughton | 359/638 |
| 5,566,367 | A * | 10/1996 | Mitsutake et al. | 359/489.08 |
| 5,650,873 | A * | 7/1997 | Gal et al. | 359/484.08 |
| 5,751,480 | A * | 5/1998 | Kitagishi | 359/485.03 |
| 6,404,550 | B1 * | 6/2002 | Yajima | 359/485.04 |
| 7,092,159 | B2 * | 8/2006 | Li | 359/489.07 |
| 7,269,307 | B2 * | 9/2007 | Jen | 385/11 |
| 7,440,113 | B2 * | 10/2008 | Trutna et al. | 356/499 |

* cited by examiner

*Primary Examiner* — Ricky D Shafer

(57) ABSTRACT

An optical system capable of enhancing a specific polarization state of light beam comprises a polarization beam splitter and a polarization state converter. The polarization beam splitter separates an input light beam into a first light beam of first polarization state and a second light beam of second polarization state. The first polarization state is different from the second polarization state. The second light beam is input into the polarization state converter and converted to a third light beam having significantly much more components of first polarization state. The polarization state converter has a configuration providing total reflection or high reflection function. The configuration includes at least one anisotropic optical thin film that is disposed between an incident medium of high refractive index and a medium of low refractive index.

8 Claims, 4 Drawing Sheets

OPTICAL SYSTEM CAPABLE OF ENHANCING SPECIFIC POLARIZATION STATE OF LIGHT AND LIGHT SOURCE SYSTEM INCLUDING SAME

CROSS-REFERENCE TO RELATED APPLICATION

This utility application claims priority to Taiwan application serial number 099119780, filed Jun. 18, 2010, which is incorporated herein by reference.

BACKGROUND OF THE INVENTION

1. Field of the Invention

This present invention relates to an optical system which is capable of enhancing a specific polarization state of a light beam and a light source system including the same.

2. Description of the Prior Art

The demand for various types of display devices has increased in the past decade. For instance, the most popular at this stage is the LCD display device and projector. These display machines use polarized light beam propagating through the components within them to achieve desired functions. Therefore, how to get a specific polarized light efficiently has been an important topic. Instead of using a conventional polarizer to absorb the unwanted polarized component from an unpolarized light, a polarization conversion device can be utilized to recycle the unwanted polarization component to increase the efficiency of display and projector. A previously proposed way to convert the non-polarized light beams of a light source into linearly polarized light beams having a single polarization state, was taught in, for example, U.S. Pat. No. 5,122,895 (Polarization Converter for converting Randomly Polarized Light to Linearly Polarized Light). In this patent, a so-called PS converter is disclosed. The P-polarized light component refers to the electric field oscillation of P light component being parallel to the plane of the incident light beam. The S-polarized light component refers to the electric field oscillation of S light component being vertical to the plane of the incident light beam.

Typically, in a system of LCD display or projector, the conventional polarization plate (polarizer) absorbs the unwanted polarized light component within the incident light beam, to obtain the required polarized light beam. The maximum output efficiency for the conventional polarizer is about 50%. In addition to lacking of efficiency as to the conventional approaches, the configuration of conventional PS converters is complex and typically involves relatively high costs of production. In addition, the display apparatus which implements the polarization state converter consumes more power than expected.

To meet the needs which cure the drawbacks mentioned above, the present invention intends to provide a novel solution of optical system capable of enhancing a specific polarization state of a light beam. By this invention, a thin film approach is used to implement a simple anisotropic film system which induces a strong polarization conversion. Together with a polarization beam splitter, other than boosting to a higher conversion efficiency, the requirements for enhancing one polarization state from an unpolarized light can be met easily.

SUMMARY OF THE INVENTION

In accordance with one aspect of the invention, the optical system is capable of enhancing a polarization state of the light beam.

The aforesaid objective of the invention is achieved by combining a polarization beam splitter and a polarization conversion configuration.

In specific, the present invention is an optical system capable of enhancing a polarization state of the light beam, comprising a polarization beam splitter, for splitting an inputted light beam into a first light beam and a second light beam, the first light beam having a first polarization state, the second light beam having a second polarization state different from the first polarization state; a polarization state converter, inputting the second light beam, for converting the polarization state and outputting a third light beam, the third light beam including significantly more of the first polarization state, wherein the polarization state converter is configured as such for providing total reflection or high reflection of light, the configuration including at least an anisotropic optical thin film, disposed between an incident medium of high refractive index and a medium of low refractive index.

More details of the respective embodiments can be found in the respective iterations in the dependent claims hereinafter recited.

According to one embodiment, the optical system includes a laminated beam splitter, the laminated beam splitter includes two triangular prisms and an optical thin film stack disposed between the two triangular prisms, and the optical thin film stack includes multiple layers of high refractive index thin film and low refractive index thin film that are interposed to each other. The optical thin film stack is highly reflective to the incident S polarized light beam, is highly transmissive to the incident P polarized light beam.

Optionally, according to another embodiment, the polarization state converter includes a prism, and the light beam reflection surface of the prism is coated with a first isotropic film/an anisotropic film/a second isotropic film for performing partial conversion or entire conversion of polarization state of light beam.

In accordance with another embodiment, the optical system further includes an element for performing partial or entire combination of the first light beam and the third light beam.

The light source system of the embodiment includes an optical system which is capable of enhancing a specific polarization state of the light beam, which is output from, for example, an LED light source. One polarization state of the output light beam from this light source system is therefore enhanced.

All aspects of the present invention will no doubt become apparent to those of ordinary skills in the art after reading the following detailed description of the preferred embodiment, which is illustrated in the following figures and drawings.

BRIEF DESCRIPTION OF THE APPENDED DRAWINGS

Figure 2A:
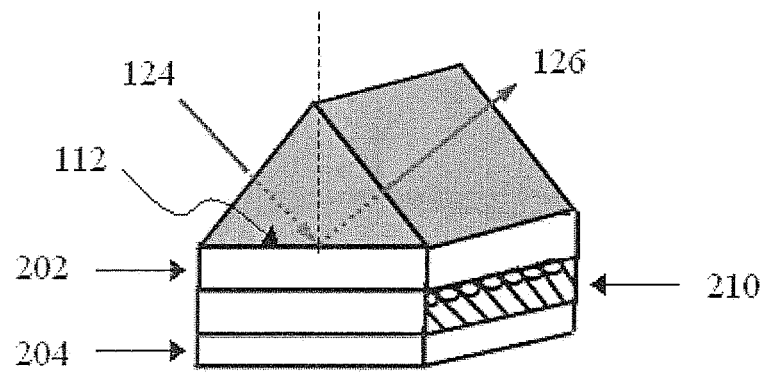
FIG. 2a shows a multiple layers structure of the glass prism 104 of high refractive index.
Figure 2B:
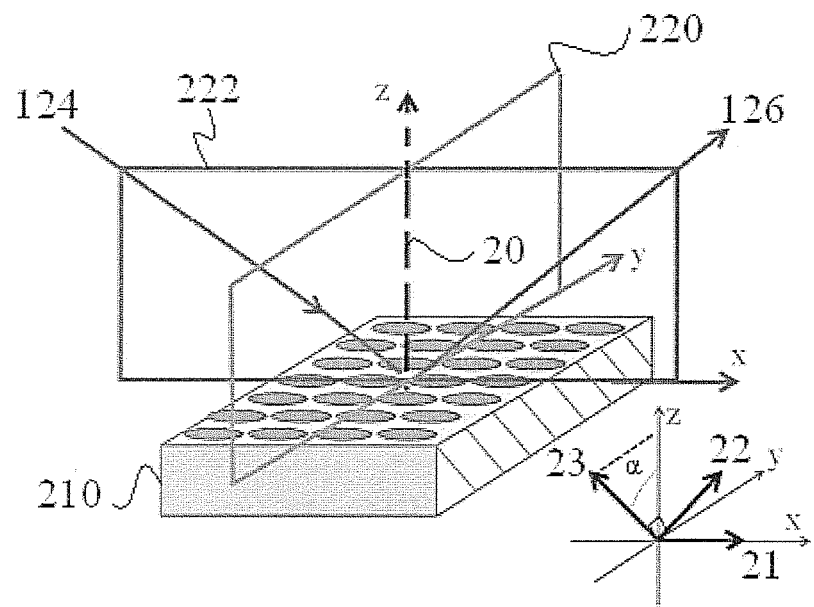
Figure 3:
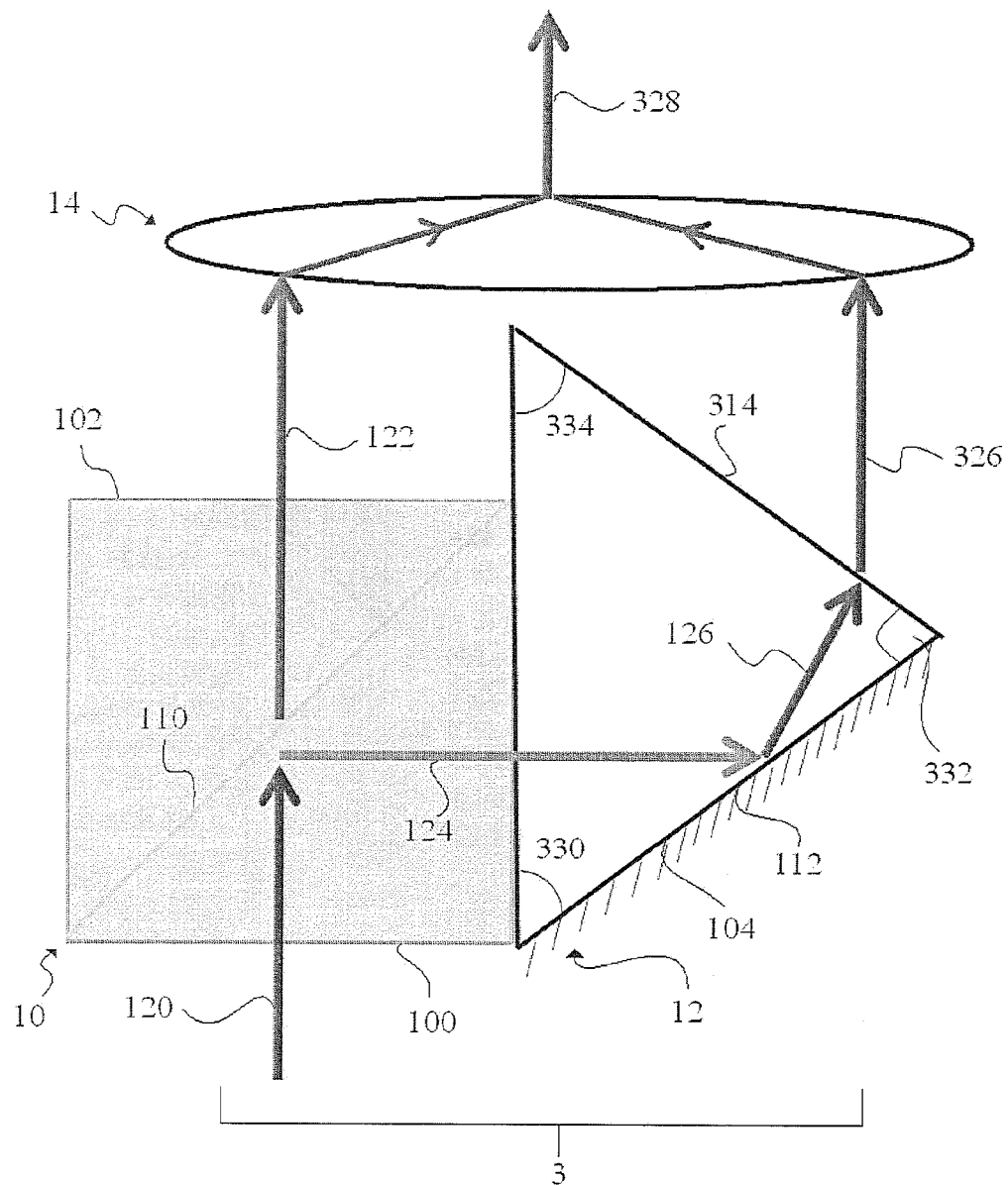
Figure 4:
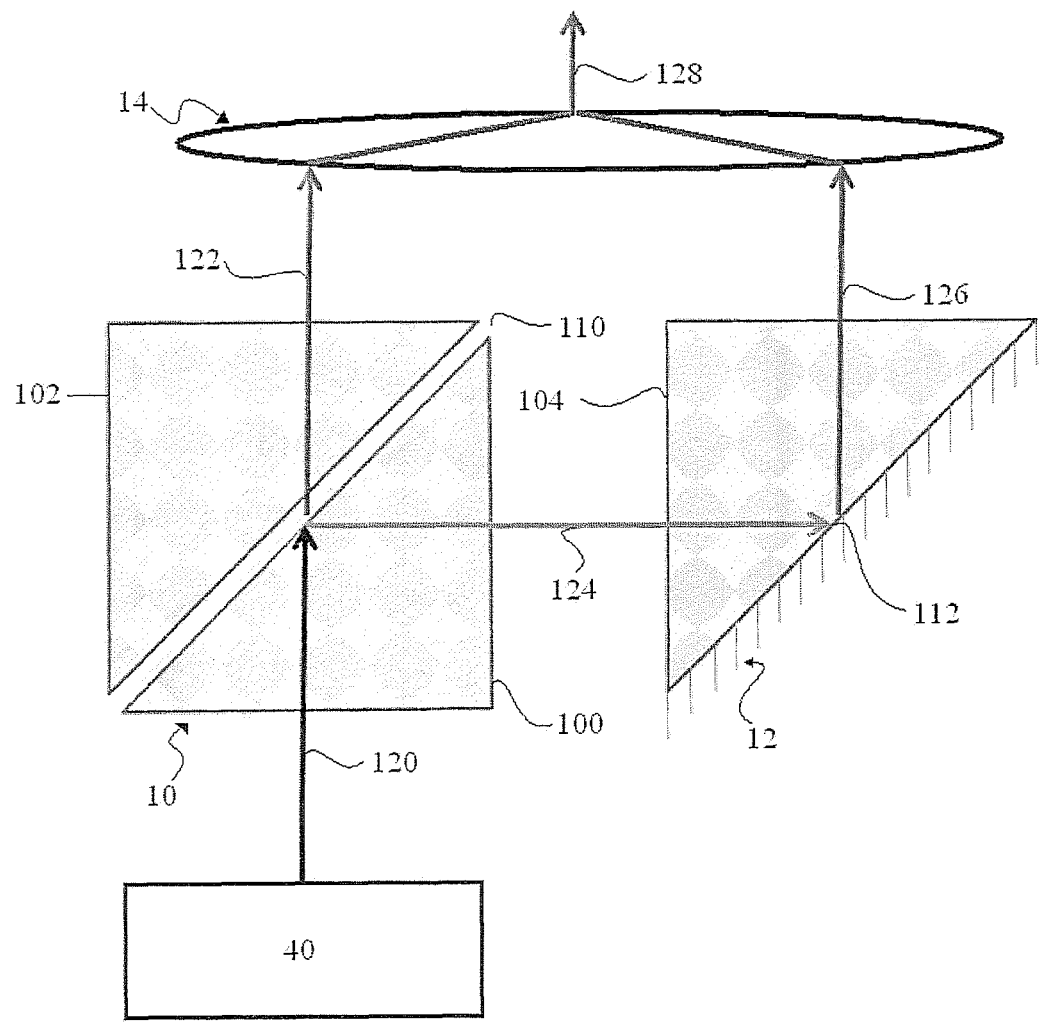

FIG. 2b discloses the relative relationship between the anisotropic thin film 210 and corresponding three principal axes;

FIG. 3 shows the optical system 3 of second embodiment;

FIG. 4 shows the embodiment of a light source system of the invention.

DETAILED DESCRIPTION OF THE INVENTION

Some preferred embodiments and practical applications of this present invention would be explained in the following paragraph, describing the characteristics, spirit and advantages of the invention.

Figure 1:
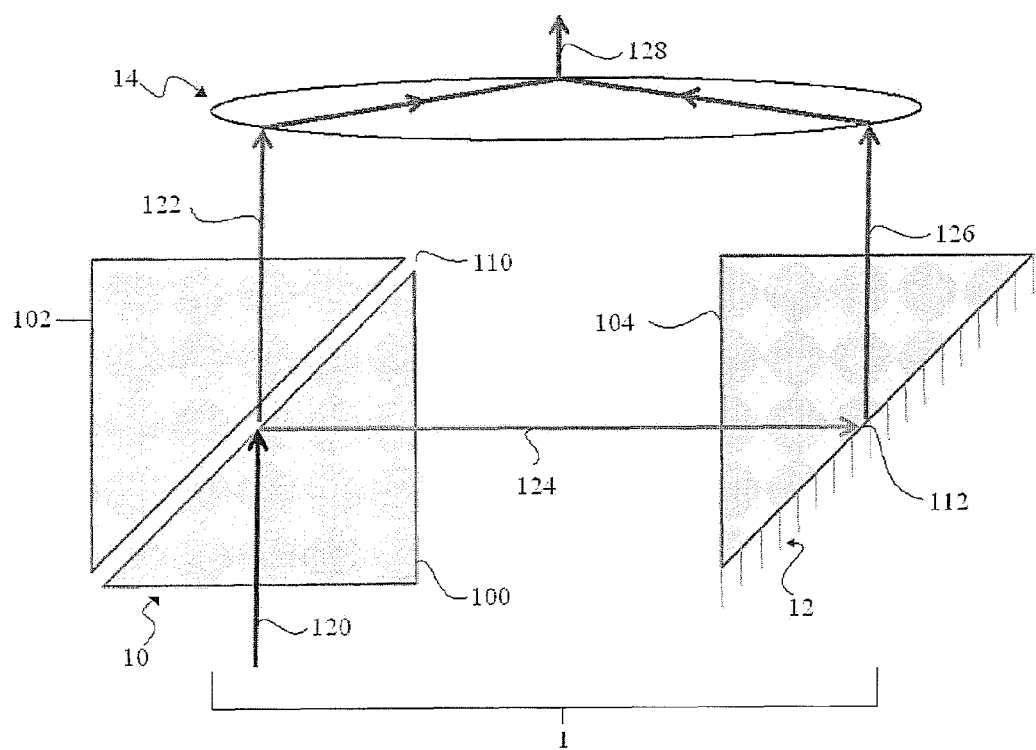
FIG. 1 shows the optical system 1 of first embodiment.

As shown in FIG. 1, the first embodiment of the optical system of the invention for enhancing a specific polarization state of a light beam includes a polarization beam splitter 10, a polarization state converter 12 and an optical (light combination) element 14.

The polarization beam splitter 10 can be a laminated beam splitter 10 which includes a triangular prism 100 and a triangular prism 102 forming a cube of the laminated beam splitter 10. Between the two triangular prisms 100 and 102, an optical thin film stack 110 is disposed, and the optical thin film stack 110 includes multiple layers of high refractive index thin film and low refractive index thin film that are interposed to each other. The optical thin film stack is highly reflective to the incident S polarized light beam, is highly transmissive to the incident P polarized light beam. Optionally, other surfaces of the cube formed by the triangular prism 100 and the triangular prism 102 are coated with multiple layers of anti-reflection films to reduce the possible loss of light reflection.

In one embodiment, the polarization beam splitter 10 can be a broadband polarization beam splitter, for instance the model No. 05FC16BP.3, which is implemented by material of SF2, produced by Newport Corporation (http://www.newport.com/).

By one embodiment, the polarization state converter 12 includes a glass prism 104 of high refractive index with the reflection surface 112 coated by at least an isotropic film and an anisotropic film. In addition, on this glass prism 104, except the light beam reflection surface 112, other surfaces can be coated with multiple layers of anti-reflection films to lower the loss of light reflection.

As shown in FIG. 1, as a non-polarized light beam 120 enters the optical system 1 of the first embodiment, the non-polarized light beam 120, while going through the polarization beam splitter 10, is divided into, by the multiple layers of film 110, a first P polarized light beam component 122 and an S polarized light beam component 124. The first P polarized light beam component 122 passes through the multiple layers of film 110 and transmits from the polarization beam splitter 10. The S polarized light beam component 124 is reflected by the multiple layers of film 110 and leaves the cube of polarization beam splitter 10. In succession, the S polarized light beam component 124 enters the polarization state converter 12, i.e. the glass prism 104 of high refractive index. The incident S polarized light beam component 124 is converted, at the reflection surface 112 of glass prism 104, to a second P polarized light beam component 126 which leaves from the polarization state converter 12. The second P polarized light beam component 126 has same polarization state and an identical (or not-identical) advancing direction, compared to those of the first P polarized light beam component 122. Afterwards, using a light combination element 14, the second P polarized light beam component 126 and the first P polarized light beam component 122 can be combined partially or entirely forming a P polarized light beam 128.

A multiple-layer structure (configuration) at the reflection surface 112 of glass prism 104 of high refractive index is shown in FIG. 2a. The multiple-layer structure includes a first isotropic film 202/an anisotropic film 210/a second isotropic film 204 sequentially disposed as shown (not to scale). That is, the light beam reflection surface 112 is formed by a first isotropic film 202/an anisotropic film 210/a second isotropic film 204. In other words, the shown configuration includes at least an anisotropic thin film 210 disposed between an incident medium of higher refractive index and a medium of lower refractive index. For the embodiment of FIG. 2a, the incident medium of higher refractive index is the glass prism 104 and the second isotropic film 204 is the medium of lower refractive index. In accordance with one embodiment, the glass prism 104 has higher refractive index of 1.515 and the material is BK7. The first isotropic film 202 utilizes the material of $MgF_2$ with thickness of 200 nm, and as the wavelength of the light beam is about 632.8 nm, the refractive index of the first isotropic film 202 is about 1.397. Similarly, the second isotropic film 204 is in form of thin film material of $MgF_2$ with thickness of 30 nm, as the wavelength of the light beam is about 632.8 nm, the refractive index of the second isotropic film 204 is also about 1.397. Furthermore, the anisotropic film 210 is in form of thin film material of $MgF_2$ with thickness of 800 nm. Relative to the anisotropic three principal axes (21, 22, 23), as shown in FIG. 2b, the three principal refractive indices of the anisotropic film 210, i.e. n21, n22, n23, are $n21=1.215$, $n22=1.216$, $n23=1.260$ respectively. It is noted that the first principal axis 21, the second principal axis 22 and the third principal axis 23 are respectively perpendicular to each other. The third principal axis 23 and the film normal 20 intersects at an angle $\alpha$, wherein $\alpha=33$ degrees. The plane formed by third principal axis 23 and the film normal 20 is noted as the deposition plane 220, the second principal axis 22 is on the deposition plane 220 and is vertical to the third principal axis 23, the deposition plane 220 is angled with the incident surface 222 at about 90 degrees.

In some embodiments, the multiple-layer film 110 is such that allows transmission of light in the visible regime from 420 nm to 680 nm.

For the light beam advancing through polarization beam splitter 10, i.e. unpolarized incident light beam 120, the first P polarized light beam component 122, the S polarized light beam component 124 and the second P polarized light beam component 126, the portion of being absorbed by the polarization beam splitter 10 can be neglected during the optical design. The Extinction Ratio (Tp/Ts) of the prism (100, 102) is about 1000:1 for the visible light range, wherein Tp is the transmittance for P polarized light beam which is greater than 90% in average, and $Ts=(1-Rs)$, wherein Rs is the reflectance for S polarized light beam which is greater than 99.5% in average.

In some embodiments, the anisotropic film 210 is an inclined column array formed by a dielectric material. The direction of columnar growth is not parallel to the plane of incidence producing the polarization conversion effect. Furthermore, the dielectric material of the anisotropic film 210 is selected from a group consisting of $MgF_2$, $SiO_2$, or $TiO_2$.

As shown in FIG. 3, the second embodiment for the optical system 3 is disclosed. The polarization beam splitter 10, the polarization state converter 12 and the optical element 14 shown are respectively similar in structure and function with those shown in FIG. 1. In FIG. 3, the first internal angle 330, the second internal angle 332 and the third internal angle 334 of the glass prism 104 of high refractive index are respectively about 51.5 degrees, 74.09 degrees and 54.41 degrees. As the incident angle is about 51.5 degrees, within the range of visible light, there are more than 90% of the incident S polarized light component 124 that are converted into the second P polarized light beam component 126. Afterwards, the second P polarized light beam component 126 is reflected to a prism interface 314 of the glass prism 104 and then refracted to outside of the prism 104. After the second P polarized light beam component 126 is refracted at the prism interface 314, it emits as a third P polarized light beam component 326. The third P polarized light beam component 326 has identical polarization state with the first P polarized light beam component 122, and identical or different advancing direction. A light combination element 14 can be used for partially or entirely combing the third P polarized light beam component 326 and the first P polarized light beam component 122 resulting in a P polarized light beam 328. The elements in FIG. 3 having same legend as elements shown in FIG. 1 respectively have same or similar structure and function and will not be redundantly iterated herein again.

As the optical system illustrated in FIG. 1, FIG. 2a, FIG. 2b or FIG. 3 is utilized at output section of various light source, e.g. LED light source, specific one polarization state of the outputted light beam passing through this system can be enhanced. As shown in FIG. 4, a light source element 40, e.g. LED light source, emits an unpolarized light beam 120 entering the optical system 1. At first, via the polarization beam splitter 10, the first P polarized light beam component 122 and S polarized light beam component 124 are formed. Then, after the S polarized light beam component 124 enters the polarization state converter 12, the second P polarized light beam component 126 is formed. At last, using the optical element 14, the first P polarized light beam component 122 and the second P polarized light beam component 126 are combined to form P polarized light beam 128. The elements in FIG. 4 having same legend as elements shown in FIG. 1 respectively have same or similar structure and function and will not be redundantly iterated herein again.

With the example and explanations above, the features and spirits of the invention will be hopefully well described. It is understood that the invention is not only limited to those described embodiments and it is highly possible for persons skilled in the arts, without departing the spirit of the invention, might make various alteration, modification or equivalent transformation.

For example, the polarization beam splitter 10 can be designed as such the outputted polarized light beam 122, 124 are respectively S polarized light beam component and P polarized light beam component. Under this situation, the function of polarization state converter 12 is to convert the P polarized light beam component into S polarized light beam component.

For a possible alteration, the polarization beam splitter 10 may be such that the outputted polarized light beam 122, 124 are respectively left circular (or elliptical) polarized light beam component and right circular (or elliptical) polarized light beam component. Under this situation, the function of polarization state converter 12 is to convert right circular (or elliptical) polarized light beam component into left circular (or elliptical) polarized light beam component.

Still for another possible alteration, the thin film 202, 204 and 210 in the polarization state converter 12 can use the anisotropic thin film of 800 nm thickness with principal refractive index of $n21=1.751$, $n22=1.685$, $n23=1.897$ respectively. This configuration can result in a broadband polarization conversion effect.

For another possible modification, the thin film 202, 204 and 210 of polarization state converter 12 can be replaced by stack of the multiple anisotropic thin films resulting in a broadband and wide angle polarization conversion effect.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. An optical system capable of enhancing a specific polarization state of a light beam, comprising:
    a polarization beam splitter, for splitting an inputted light beam into a first light beam and a second light beam, said first light beam having a first polarization state, said second light beam having a second polarization state different from said first polarization state;
    a polarization state converter, inputting said second light beam, for converting the second polarization state and outputting a third light beam, said third light beam including significantly more components of said first polarization state, wherein the polarization state converter is configured as a configuration for providing total reflection or high reflection of light, said configuration including at least an anisotropic optical thin film disposed between an incident medium of higher refractive index and a medium of lower refractive index, wherein the anisotropic optical thin film is an inclined column array formed of a dielectric material, said column array's orientation not lying on plane of incidence of the second light beam produces the polarization conversion effect.

2. The optical system of claim 1, wherein the polarization beam splitter includes a laminated beam splitter, said laminated beam splitter includes two triangular prisms and an optical thin film stack disposed between the two triangular prisms, and the optical thin film stack includes multiple layers of high refractive index thin film and low refractive index thin film that are interposed to each other, whereby said optical thin film stack performs high reflection function to components of S polarized light beam within the inputted light beam, said optical thin film stack performs high transmission function to components of P polarized light beam within the inputted light beam.

3. The optical system of claim 1, wherein said polarization state converter performs partial conversion or entire conversion of the second polarization state.

4. The optical system of claim 1, further comprising a combiner for performing partial or entire combination of said first light beam and said third light beam.

5. The optical system of claim 1, wherein said first polarization state is P polarized state and said second polarization state is S polarized state.

6. The optical system of claim 1, wherein the incident medium is a glass prism.

7. The optical system of claim 1, wherein material for the anisotropic optical thin film is selected from a group consisting of $MgF_2$, $SiO_2$, or $TiO_2$.

8. An optical system capable of enhancing a specific polarization state of a light beam, comprising:
    a polarization beam splitter, for splitting an inputted light beam into a first light beam and a second light beam, said first light beam having a first polarization state, said second light beam having a second polarization state different from said first polarization state;
    a polarization state converter, inputting said second light beam, for converting the second polarization state and outputting a third light beam, said third light beam including significantly more components of said first polarization state, wherein the polarization state converter is configured as a configuration for providing total reflection or high reflection of light, said configuration including at least an anisotropic optical thin film disposed between an incident medium of higher refractive index and a medium of lower refractive index, and the anisotropic optical thin film is an inclined column array formed of a dielectric material, said column array's orientation not lying on plane of incidence of the second light beam produces the polarization conversion effect, wherein the anisotropic optical thin film has thickness of 800 nm with principal refractive index of n21=1.751, n22=1.685, n23=1.897 respectively.

\* \* \* \* \*